United States Patent [19]

Futakuchi

[11] Patent Number: 4,628,879
[45] Date of Patent: Dec. 16, 1986

[54] ENGINE INTAKE SYSTEM

[75] Inventor: Yorio Futakuchi, Shizuoka, Japan

[73] Assignee: Yamaha Hatsudoki Kabushiki Kaisha, Iwata, Japan

[21] Appl. No.: 841,689

[22] Filed: Mar. 19, 1986

Related U.S. Application Data

[60] Continuation of Ser. No. 614,798, May 29, 1984, abandoned, which is a division of Ser. No. 423,558, Sep. 27, 1982, Pat. No. 4,469,067.

[30] Foreign Application Priority Data

Sep. 29, 1981 [JP] Japan .......................... 56-154391[U]

[51] Int. Cl.$^4$ ............................................. F02B 31/00
[52] U.S. Cl. .............................. 123/308; 123/52 MV; 123/432
[58] Field of Search ......... 123/52 MB, 52 MV, 52 M, 123/55 VF, 55 VS, 55 VE, 306, 308, 432, 315, 55 V; 180/219, 218, 228

[56] References Cited

U.S. PATENT DOCUMENTS

| 2,012,902 | 8/1935 | Barkeij | 123/55 VE |
|---|---|---|---|
| 2,318,915 | 5/1943 | Anderson et al. | 123/308 |
| 3,148,669 | 9/1964 | Platner et al. | 123/547 |
| 3,408,992 | 11/1968 | Seggern et al. | 123/188 M |
| 3,492,977 | 2/1970 | Fager | 123/55 VE |
| 3,859,971 | 1/1975 | Rauen | 123/432 |
| 4,214,644 | 7/1980 | Matsuda | 123/55 R |
| 4,231,329 | 11/1980 | Ishida | 123/52 MB |
| 4,249,495 | 2/1981 | Trihey | 123/308 |
| 4,287,863 | 9/1981 | Rauen | 123/432 |
| 4,300,504 | 11/1981 | Tezuka | 123/432 |
| 4,354,463 | 10/1982 | Otawi et al. | 123/308 |
| 4,368,698 | 1/1983 | Matsuo et al. | 123/52 M |
| 4,408,576 | 10/1983 | Sakaoka | 123/308 |
| 4,438,743 | 3/1984 | Namba et al. | 123/308 |

FOREIGN PATENT DOCUMENTS

| 1093709 | 5/1955 | France . | |
|---|---|---|---|
| 0140016 | 10/1979 | Japan | 123/52 MB |
| 0093922 | 7/1980 | Japan | 123/308 |
| 0134744 | 10/1980 | Japan | 123/432 |
| 0018019 | 2/1981 | Japan | 123/306 |
| 0108409 | 7/1982 | Japan | 123/306 |
| 0137617 | 8/1982 | Japan | 123/52 M |
| 2058906 | 4/1981 | United Kingdom . | |

Primary Examiner—Charles J. Myhre
Assistant Examiner—David A. Okonsky
Attorney, Agent, or Firm—Ernest A. Beutler

[57] ABSTRACT

An improved induction system for a V type engine that improves both charging and combustion efficiency. The engine includes an induction system for each cylinder barrel that includes a pair of intake valves and respective intake passages that have a common inlet. One of the intake passages is curved and an auxiliary intake passage extends through the cylinder head and terminates at an auxiliary intake port that is disposed at one side of the main intake port in proximity to the cylinder barrel for generating a swirl to the intake charge. A plenum chamber is positioned in the V of the engine and defines two separate chambers each of which communicates with a respective one of the auxiliary intake passages.

11 Claims, 2 Drawing Figures

ENGINE INTAKE SYSTEM

This application is a continuation of application Ser. No. 614,798, filed May 29, 1984 and now abandoned, which is a division of application Ser. No. 423,558, filed Sept. 27, 1982 and now U.S. Pat. No. 4,469,067.

BACKGROUND OF THE INVENTION

This invention relates to an engine intake system and more particularly to an improved high efficiency intake system for engines that improves running throughout the engine speed and load ranges.

It has been found that engine induction efficiency and combustion, particularly at low and medium speeds may be improved by providing an auxiliary intake that communicates with the combustion chamber and which has a relatively small effective area. Such auxiliary intakes have been found to give rise to a high velocity and turbulence in the combustion chamber at the time of ignition that improves flame propagation and engine running. Such devices also improve charging efficiency by minimizing pulsations in the intake system.

Such auxiliary systems are particularly advantageous if disposed in such an arrangement so as to impart a swirl to the charge delivered by the auxiliary system. It is also advantageous to have the auxiliary intake system communicate with the combustion chamber through the main intake passage. Such an arrangement eliminates the necessity for separate intake valves and lessens the complexity of the cylinder head configuration. However, with conventional intake systems, it has been difficult to provide an auxiliary intake that has the desired location and which will be easy to manufacture and not interfere with the configuration of the main intake passage. This is particularly true in multi-cylinder engines in which aligned intake cylinders are employed since the intake passages from one cylinder may interfere with the intake passages and auxiliary intake passages of the next adjacent cylinders.

It is, therefore, a principal object of this invention to provide an improved induction system for an internal combustion engine.

It is another object of the invention to provide an engine induction system wherein both main and auxiliary intake passages may be formed and the auxiliary intake passage located so that a high degree of swirl may be generated.

The amount of swirl generated by the auxiliary intake passage can be increased if the main intake passage is located at an offset relationship to the axis of the associated cylinder. If this is done, the auxiliary intake passage may be positioned at one side of the main intake passage and in close proximity to the periphery of the bore of the associated cylinder. With such an arrangement, however, it is difficult with prior art type of constructions so as to locate both the main and auxiliary intake passages so they do not interfere with each other and so that they do not interfere with the intake passages of the next adjacent cylinder of an in-line engine. Furthermore, the prior art constructions of this type have given rise to considerable problems in connection with the location and formation of the auxiliary intake port and passage by means of a simple machining operation.

It is, therefore, a still further object of this invention to provide an improved intake system for an internal combustion engine wherein at least one of the main intake passages is offset from the cylinder bore axis and the auxiliary intake passage which communicates with the combustion chamber through the main intake passage is offset relative to the main intake passage and in close proximity to the wall of the associated cylinder so as to promote swirling.

In conjunction with the use of auxiliary intake passages as aforedescribed, it has been found advantageous to provide a plenum chamber or volume that supplies the auxiliary intake passage. By employing such a plenum chamber or volume, it has been found that the flow of the intake charge in the intake passage may be stabilized even at low speed and pulsations eliminated or substantially reduced. Where a V type engine is employed, however, it is difficult at times to provide an appropriate location for such a plenum chamber. This is particular true in conjunction with motorcycles where size is of a premium and in conjunction with multiple cylinder engines which employ separate plenum chambers for each chamber.

It is, therefore, a still further object of this invention to provide an improved, compact high efficiency induction system for a V type engine.

In conjunction with V type engines, the cylinders of the cylinder banks are normally staggered slightly from each other. As a result, with prior art type of induction systems, the intake passages are also staggered with respect to each other. Such staggered intake passages give rise to complex induction systems and also can limit the type of carburetion which is employed. That is, if the intake ports of the engine are not aligned with each other, it may be necessary to use a separate carburetor for each intake port.

It is, therefore, a still further object of this invention to provide an improved induction system for a V type engine wherein the intake ports of the respective cylinders are aligned with each other.

SUMMARY OF THE INVENTION

A first feature of this invention is adapted to be embodied in an induction system for an internal combustion engine that has a cylinder and an intake port that communicates with the cylinder and which has its central axis offset from the central axis of the cylinder. In accordance with this feature of the invention, an auxiliary intake port communicates with the cylinder through the intake port and is offset from the central axis of the intake port toward the periphery of the cylinder for effecting a swirl to the intake charge delivered to the cylinder from the auxiliary intake port.

Another feature of the invention is adapted to be embodied in an internal combustion engine that has a chamber defined in part by a cylinder and a pair of intake ports serving the chamber. In accordance with this feature of the invention, an auxiliary intake port serves the chamber through only one of the intake ports and is disposed in proximity to a wall of the cylinder for imparting a swirl to the intake charge delivered thereto.

Another feature of the invention is adapted to be embodied in an engine having a cylinder head which is adapted to register with a cylinder and define combustion chamber. An intake port is formed in the cylinder head and an intake valve controls the flow through the intake port. An intake passage extends from an outer wall of the cylinder head through the cylinder head and terminates at the intake port. In accordance with this feature of the invention, the intake passage extends in a non-perpendicular relationship to the intake port and a substantially straight auxiliary intake passage extends from the cylinder head surface in spaced realtion to the inlet to the intake passage and terminates in communication with the intake passage contiguous to the intake port.

Another feature of the invention is adapted to be embodied in an induction system for a V type engine having a valley between the cylinder banks. In accordance with this feature of the invention, a plenum device is located in the valley of the V and defines a pair of independent chambers. First passage means communicate one of the chambers with a cylinder of one bank and second passage means communicate the other of the chambers with a cylinder of the other bank.

Still a further feature of the invention is also adapted to be embodied in a V type engine having a separate cylinder head for each cylinder bank. Each cylinder head cooperates with a respective cylinder to form a combustion chamber. An intake port is formed in each cylinder head communicating with each combustion chamber. Intake valves control the flow through each of the intake ports. An intake passage extends from an inlet formed in a surface of each cylinder head through the respective cylinder head and terminates at the intake port. In accordance with this feature of the invention, the intake ports are non-aligned in a plane parallel to the axis of the V and containing the intake ports and the intakes to the intake passages are aligned in a plane parallel to the axis of the V and containing the intakes.

DETAILED DESCRIPTION OF THE PREFERRED EMBODIMENTS OF THE INVENTION

Figure 1:
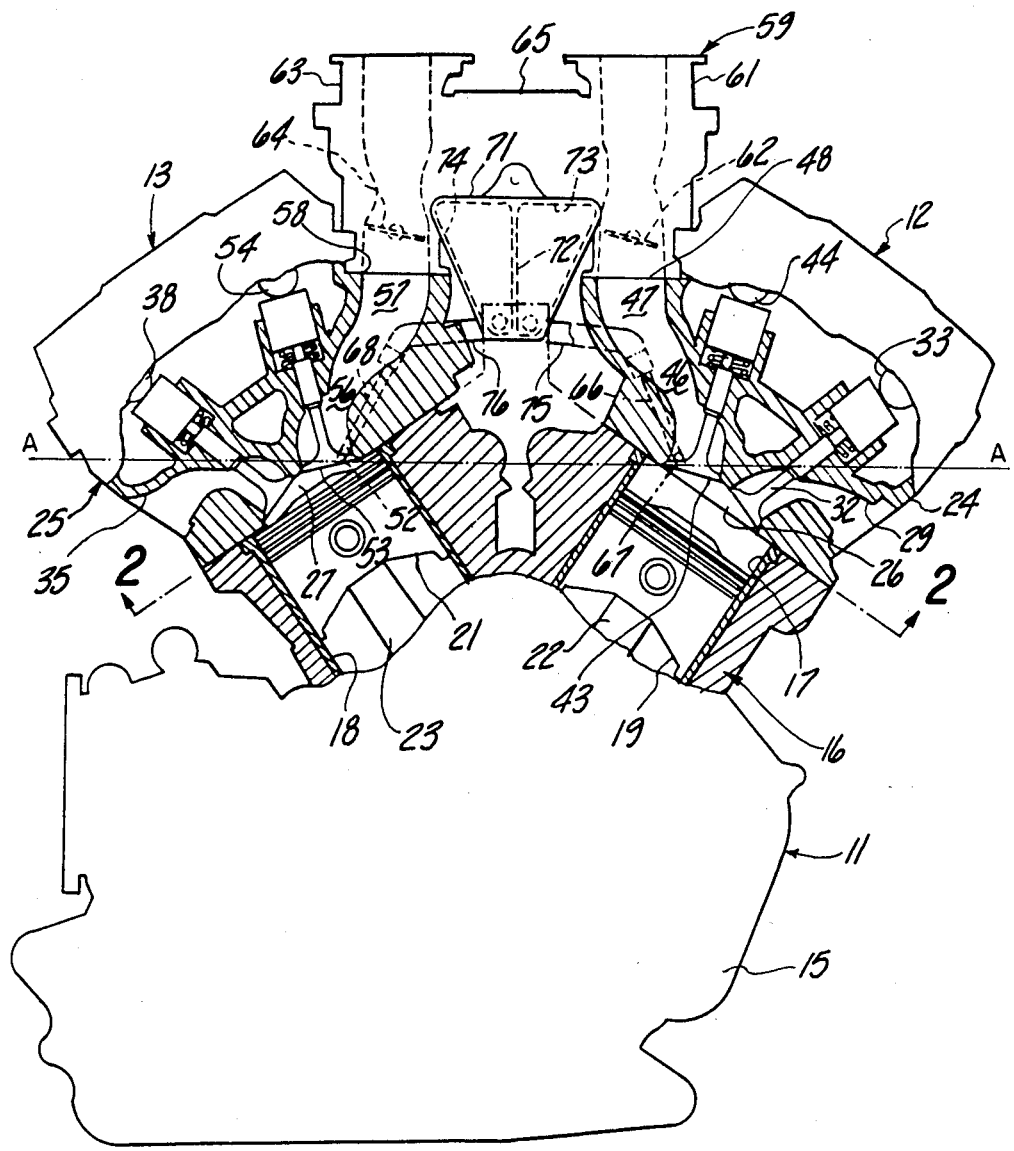
FIG. 1 is a side elevational view, with portions broken away, of an engine constructed in accordance with this invention.

A V type motorcycle engine constructed in accordance with an embodiment of this invention is identified generally by the reference numeral 11. The engine 11 is disposed with its crankshaft (not shown) extending transversely to the longitudinal axis of the motorcycle. The engine 11 has a forwardly inclined cylinder bank 12 and a rearwardly inclined cylinder bank 13 that are supported upon a combined crankcase and transmission assembly 15.

The engine 11 is formed with a unitary cylinder block, indicated generally by the reference numeral 16 in which a forwardly inclined cylinder bore 17 and rearwardly inclined cylinder bore 18 are formed. Pistons 19 and 21 reciprocate in the cylinder bores 17 and 18 respectively and drive the crankshaft in a known manner through respective connecting rods 22 and 23.

Cylinder heads, indicated generally by the reference numerals 24 and 25 are affixed to the respective banks of the cylinder block 16 and have respective cavities 26 and 27 that cooperate with the cylinder bores 17, 18 and pistons 19, 21 to form variable volume chambers. At times the cavities 26 and 27 will be referred to generically as the "combustion chambers".

The cylinder head 24 is formed with a pair of forwardly facing exhaust passages 28 and 29 that extend from exhaust ports that communicate with the chamber 26 and terminate in forwardly facing exhaust outlets formed in the forward side of the cylinder head 24. Exhaust valves 31 and 32 control the flow from the chamber 26 through the exhaust passages 28 and 29, respectively. The exhaust valves 31 and 32 are operated in any known manner, as by means of an overhead camshaft shown partially and indicated generally by the reference numeral 33.

The cylinder head 25 of the rearwardly facing cylinder bank 13 is provided with a pair of rearwardly facing exhaust passages 34 and 35. The passages 34 and 35 extend from exhaust ports that communicate with the chamber 27 and terminate in outlet openings formed in the rear face of the cylinder head 25. Exhaust valves 36 and 37 cooperate with the exhaust ports so as to control the flow of exhaust gases from the chamber 27 into the exhaust passages 34 and 35. The exhaust valves 36 and 37 are operated in a known manner as by means of an overhead mounted exhaust camshaft, shown partially and indicated by the reference numeral 38.

A suitable exhaust system consisting of exhaust pipes, mufflers and the like extend from the respective cylinder head exhaust passages 28, 29, 34 and 35 for discharging the exhaust gases to the atmosphere.

The front cylinder head 24 has a pair of intake ports 39 and 41 that are disposed in registry with the combustion chamber 26 on the side of the cylinder head opposite to the exhust valves 31 and 32. The intake ports 39 and 41 are also spaced on opposite sides of a plane containing the axis of the cylinder bore 17 and extending perpendicularly to the axis of rotation of the crankshaft. Intake valves 42 and 43 cooperate with the intake ports 39 and 41 so as to control the flow of intake charge into the chamber 26. The intake valves 42 and 43 are operated in a suitable manner from an overhead camshaft shown partially and identified by the reference numeral 44.

Intake passages 45 and 46 extend from the intake ports 39 and 41, respectively, and merge into a single intake passage 47 that extends upwardly through the cylinder head 24 and terminates in an inlet 48 formed in the upper face of the cylinder head 24. It should be noted from FIG. 2 that the inlet passage 45 extends generally in a straight direction whereas the inlet passage 46 extends at an angle and is partially curved relative to the plane of the intake port 41. Said another way, the inlet passage 46 is disposed in non-perpendicular relationship to the intake port 41 for a reason to be described.

The rear cylinder head 25 is also formed with a pair of inelt ports 49 and 51 which are disposed on the opposite side of a plane containing the axis of the cylinder bore 18 from the exhaust valves 36 and 37 and on opposite sides of a perpendicular plane from each other. Intake valves 52 and 53 cooperate with the intake ports 49 and 51 to control the flow of intake charge into the chamber 27. The intake valves 52 and 53 are operated in a known manner from an overhead camshaft 54.

An intake passage 55 extends in a non-perpendicular relationship from the intake port 49 and in a somewhat curved fashion as with the intake passage 46 of the cylinder head 24. However, the curvature or inclination of the intake passage 55 is in the opposite direction to that of the intake passage 46 so that the intake passages 55 and 46 extend generally toward each other. An intake passage 56 extends through the cylinder head from the intake port 51 and the intake passages 55 and 56 terminate in a common intake passage 57 that extends upwardly through the cylinder head and terminates at an inlet 58 formed in an upper surface of the cylinder head 25.

Figure 2:
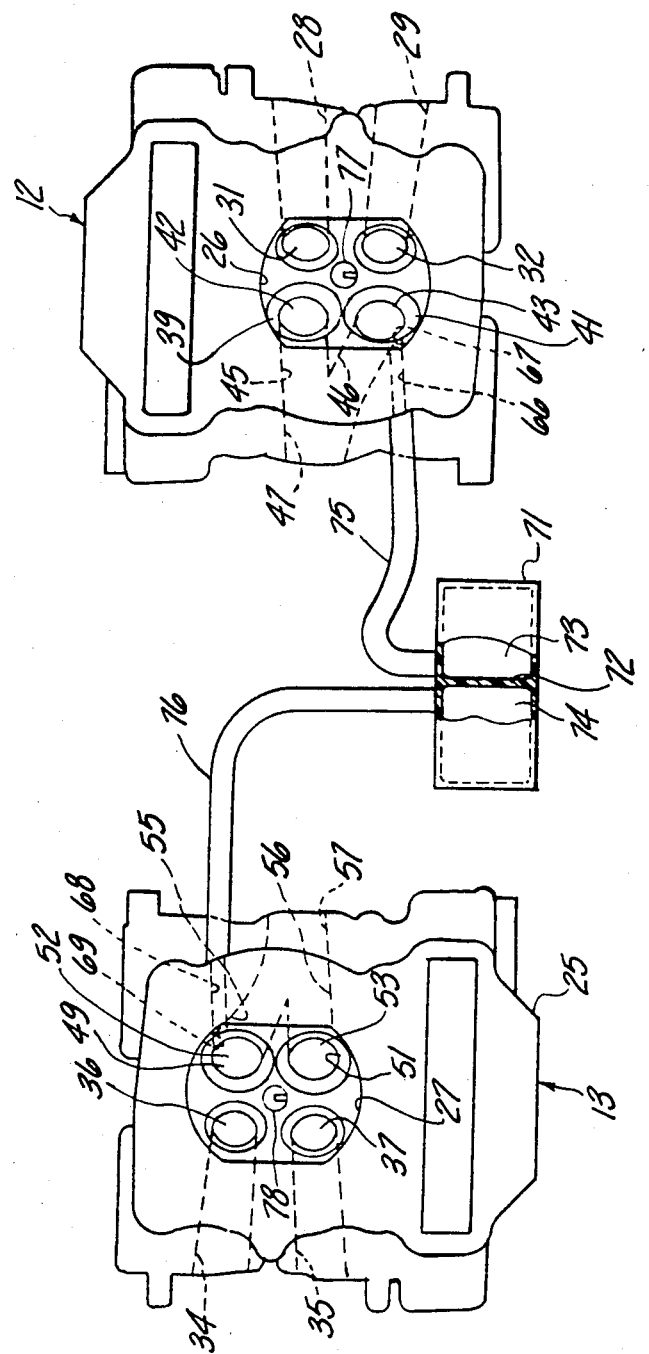
FIG. 2 is a cross-sectional view taken generally along the line 2—2 of FIG. 1.

As will be noted from FIG. 2, the cylinders of the bank 16 are offset or staggered from the cylinders of the bank 13 so that the connecting rods 22 and 23 can cooperate with a common journal on the crankshaft as is well known in this art. Hence, the intake ports 39 and 41 are offset or staggered relative to the intake ports 49 and 51. However, the configuration of the intake passages is such that the inlet openings 48 and 58 lie at the same longitudinal position. This permits the use of a single, two-barrel carburetor as indicated generally by the reference numeral 59 so as to serve both cylinder banks. As is well known, the carburetor 58 includes a barrel 61 in which a throttle valve 62 is supported for serving the inlet 48 of the cylinder head 24. In addition, a barrel 63 has a throttle valve 64 for serving the inlet 58 of the cylinder head 25. The barrels 61 are 63 are integrally connected together by means of a briding portion 65 of the carburetor body. The throttle valves 62 and 64 are operated in unison in any known manner from the operator throttle control.

In order to improve charging and combustion efficiency an auxiliary intake system is provided for each combustion chamber 26 and 27. Considering that first for the combustion chamber 26, a relatively small cross-sectional area, drilled auxiliary passage 66 extends through the cylinder head 24 and terminates at an auxiliary intake port 67 that is disposed at one side of the intake passage 47 in proximity to the intake port 41. Because of this offset, the port 67 will be disposed in proximity to the wall of the cylinder bore 17 and the charge which flows from the auxiliary intake port 67 into the chamber 26 will be directed to flow in a circumferential direction so as to impart a swirl to the intake charge. Due to the curvature of the main intake passage 46, the auxiliary intake passage 66 may be formed by a simple drilling operation without any interference and so as to insure this geometric relationship to the cylinder bore 17.

In a like manner, an auxiliary intake passage 68 is drilled through the cylinder head 25 and terminates at an auxiliary intake port 69 that intersects the main intake passage 55 in proximity to and at one side of the intake port 49. Again, the auxiliary intake port 69 is disposed in proximity to the cylinder bore 18 so as to generate a swirl to the intake charge.

To further improve charging efficiency, a plenum device, indicated generally by the reference numeral 71 is provided. The plenum device 71 may be conveniently located in the valley of the V of the engine and specifically between the cylinder heads 24 and 25. The plenum device 71 has in internal wall 72 that divides the plenum device 71 into first and second chambers 73 and 74. A conduit 75 extends from the chamber 73 and communicates with an inlet end of the auxiliary induction passage 66. A conduit 76 extends from the chamber 74 and terminates at an inlet end of the auxiliary intake passage 68. Preferably, the length of the conduits 75 and 76 are maintained equal so as to achieve equal flow characteristics into the respective combustion chambers 26 and 27.

It should be noted from FIG. 2 that the intake valves 42, 43 and exhaust valves 31, 32 of the chamber 26 and exhaust valves 36, 37 and intake valves 52, 53 associate with the chamber 27 are disposed at the corners of a rectangle. As a result, the periphery of these valves will be disposed closely adjacent the respective cylinder bores 17 and 18. Because of the offset of the auxiliary intake passages 66 and 68, the auxiliary intake ports 67 and 69 therefore lie at the periphery of the cylinder wall so that the intake charge flowing from the auxiliary intake passages 66 and 68 will induce a swirl in the chambers.

Spark plugs 77 and 78 are located centrally of the respective chambers 26 and 27 for firing the charge therein in a known manner.

In operation, during the running of the engine, the intake valves 42, 43 and 52, 53, will be sequentially opened and closed. Particularly at low engine speeds, this opening and closing has, with prior art arrangements, caused pulsations in the intake flow which adversely affects charging efficiency. However, the use of the plenum chambers 73 and 74 and the auxiliary intake passages 66 and 68 causes the flow through the induction system to be more uniform. When the intake valves close, the flow inertia will tend to cause the intake charge to flow through the auxiliary intake passages 66 and 68 into the plenum chambers 73 and 74. Upon the next opening of the intake valves 42, 43 and 52, 53, some of the intake charge will be delivered back from the plenum chambers 73 and 74 to the respective chambers 26 and 27. Due to the relatively small size of the passages 66 and 68, this charge will enter the chambers at a high velocity and in a generally tangential direction, as aforenoted, so as to impart a swirl. This high velocity swirling charge causes rapid flame propagation upon firing of the spark plugs 77 and 78 so as to insure complete and good combustion as well as smooth combustion even under low engine running speeds. Thus, both charging efficiency and combustion efficiency are improved with the enclosed system.

Because the plenum device 71 is located in the V of the engine and the passages 75 and 76 are the same length, there will be no power difference between the respective cylinders and smooth running will be further improved. In addition, a compact arrangement is provided which also is easy to manufacture as aforenoted.

Although the described arrangement has been discussed in conjunction with a two cylinder V type engine, it should be readily apparent that it can be used in conjunction with V type engines having other numbers of cylinders or, in fact, with in-line engines. In addition to permitting ease of machining of the auxiliary intake passages, the described construction permits application of this principle to in-line engines without the induction system of one cylinder interferring with that of the next adjacent cylinders. In the illustrated embodiment, the plenum device 71 is provided with separate plenum chambers for each of the cylinders. This is does done because engines having two cylinder V type arrangements have uneven firing intervals. However, if the invention is employed with a multiple cylinder engine, it may be practical to use a single plenum chamber for all cylinders or, alternatively, the area downstream of the throttle valves of the engine may be used as a plenum device. That is, in such an arrangement those cylinders which are not undergoing their intake cycle will act as plenum chambers for a cylinder which is undergoing an intake cycle.

In the illustrated embodiment, a single throttle valve is provided for each intake passage at its common portion. It is to be understood that additional throttle valves may be provided in the induction system downstream of the main throttle valves and opened at a delayed sequence with the main throttle valves. Such a throttling valve arrangement may improve even further running characteristics since a larger portion of the intake charge can be delivered to the respective chambers from the auxiliary intake passages.

In the illustrated embodiment, the intake passages have a common inlet. It is to be understood that certain features of the invention may be employed in conjunction with engines having independent intake passages for each intake port. The invention can also be used in conjunction with engines having other than two intake valves, either more or less, although the invention has particular utility in conjunction with engines having plural intake valves. If more than two intake valves are employed, the auxiliary intake passage should communicate with one of the intake valves that is closest to the periphery of the associated cylinder. In addition to the variations and other embodiments described, various other changes and modifications may be made without departing from the spirit and scope of the invention, as defined by the appended claims.

I claim:

1. In an induction system for an internal combustion engine having a cylinder having a bore with a bore axis and a first intake port communicating with said cylinder, said first intake port having its center offset from said bore axis of said cylinder, a second intake port communicating with said cylinder at a point offset from said bore axis and spaced from said first point, said intake ports both lying substantially on one side of a first plane containing said bore axis and substantially on opposite sides of a second plane containing said bore axis and perpendicular to said first plane, a pair of exhaust ports lying on the other side of said first plane, said exhaust ports lying on opposite sides of said second plane, the improvement comprising an auxiliary intake port communicating with said cylinder only through said first intake port and offset from the center of said first intake port toward the periphery of said cylinder and means for generating a high velocity flow into said cylinder from said auxiliary intake port for effecting a swirl to the intake charge delivered to said cylinder from said auxiliary intake port.

2. In an induction system as set forth in claim 1 wherein the auxiliary intake port is in communication with an auxiliary intake passage that extends perpendicularly to the second plane.

3. In an induction system as set forth in claim 1 further including a plenum chamber communicating with the auxiliary intake port for generating the high velocity flow.

4. In an induction system as set forth in claim 1 wherein the intake ports are in communication with a plurality of intake passages, said intake passages having a common inlet end.

5. In an induction system as set forth in claim 4 wherein the common inlet end of the intake passages is offset in a plane perpendicular to the central axis from the one intake port and toward the second intake port and wherein the auxiliary intake passage extends in perpendicular relation to the one intake port and terminates at the auxiliary intake port.

6. In an induction system as set forth in claim 5 further including a plenum chamber communicating with the auxiliary intake port for generating the high velocity flow.

7. In an induction system for a V type engine having a crankshaft and a separate cylinder head for each cylinder bank, said crankshaft defining a crankshaft axis along its length, each cylinder head forming a combustion chamber with the respective cylinder, a pair of intake ports formed in each cylinder head communicating with each combustion chamber on one side of a respective first plane containing the axis of the respective cylinder bore and extending in a direction parallel to the crankshaft axis, the pair of intake ports of each cylinder head lying on the one side of said first plane adjacent the opposite cylinder head, intake valves for controlling the flow through said intake ports, said intake ports of each cylinder head being spaced from each other in the axial direction with respect to the crankshaft axis, an intake passage extending from a single inlet formed in a surface of each cylinder head adjacent the other cylinder head, each said intake passage extending from its single inlet through the respective cylinder head and terminating at both of said intake ports, a pair of exhaust ports in each of said cylinder heads communicating with the respective cylinder and lying on the opposite side of each said respective first plane, the improvement comprising at least one of said intake ports of one cylinder head being aligned in a second plane with at least one of the intake ports of the other cylinder head, said second plane being perpendicular to the axis of said crankshaft, said single inlets to the respective of said intake passages being aligned in said second plane, the remaining of said intake ports of said cylinder heads lying on opposite sides of said second plane with respect to each other.

8. In an induction system as set forth in claim 7 further including an auxiliary intake passage extending through each cylinder head from an outer surface thereof and terminating at an auxiliary intake port formed in one of the intake passages contiguous to only one of the intake ports for the respective chamber.

9. In an induction system as set forth in claiim 8 wherein the auxiliary intake port of one bank is disposed on the opposite side of the chamber from that of the other bank.

10. In an induction system as set forth in claim 9 further including means for delivering a high velocity charge to the cylinder through the respective auxiliary intake port.

11. In an induction system as set forth in claim 10 wherein the means for delivering the high velocity charge comprises plenum chamber communicating with the auxiliary intake port.

* * * * *